US012669606B2

(12) United States Patent
Ho

(10) Patent No.: US 12,669,606 B2
(45) Date of Patent: Jun. 30, 2026

(54) HIGH PRECISION PHOTONIC DISTANCE METER CIRCUIT AND DISTANCE MEASURING METHOD

(71) Applicant: PixArt Imaging Incorporation, HsinChu (TW)

(72) Inventor: Wen-Hao Ho, Hsinchu (MY)

(73) Assignee: PIXART IMAGING INCORPORATION, Hsinchu (TW)

( * ) Notice: Subject to any disclaimer, the term of this patent is extended or adjusted under 35 U.S.C. 154(b) by 960 days.

(21) Appl. No.: 17/840,523

(22) Filed: Jun. 14, 2022

(65) Prior Publication Data

US 2023/0400576 A1     Dec. 14, 2023

(51) Int. Cl.
| | |
|---|---|
| *G01S 17/00* | (2020.01) |
| *G01S 7/484* | (2006.01) |
| *G01S 7/4865* | (2020.01) |
| *G01S 17/10* | (2020.01) |

(52) U.S. Cl.
CPC .............. *G01S 17/10* (2013.01); *G01S 7/484* (2013.01); *G01S 7/4865* (2013.01)

(58) Field of Classification Search
USPC ....................................................... 356/5.01
See application file for complete search history.

(56) References Cited

U.S. PATENT DOCUMENTS 4,564,819 A * 1/1986 Hirose ................ H02M 1/0845
                                                    331/25
5,214,677 A * 5/1993 Mori ........................ H03L 7/095
                                                    331/DIG. 2

2013/0278917 A1* 10/2013 Korekado ............... G01S 7/484
                                                    356/5.01
2016/0363654 A1   12/2016 Wyland
2019/0220055 A1*  7/2019 Gal .......................... H03L 7/104
2020/0363506 A1* 11/2020 Shen ....................... G01S 7/497
2020/0379095 A1* 12/2020 Kappel ................. G01S 7/4861
2021/0293958 A1*  9/2021 Hirono ................... G01S 7/497
2021/0302547 A1*  9/2021 Ozeki .................. G01S 17/894
2021/0344347 A1* 11/2021 Kato ........................ G01C 3/06
2023/0059991 A1*  2/2023 Liang .................... G01S 7/4865

FOREIGN PATENT DOCUMENTS

CN            110168398 A       8/2019

* cited by examiner

*Primary Examiner* — James R Hulka

(74) *Attorney, Agent, or Firm* — Tung & Associates

(57) ABSTRACT

A distance meter circuit includes: a driver for generating a driving pulse according to a measuring control signal to drive a laser diode to emit a light pulse to an object; a photonic sensing device for generating a first light conversion signal in response to the light pulse reflected by the object; a read-out circuit for measuring a TOF of the light pulse reflected by the object; an adjustable delay circuit for providing an adjustable delay time between the measuring control signal and the measuring trigger signal, or between the measuring control signal and the driving pulse; and a DLL controller for generating a delay control signal by comparing a phase difference between the measuring trigger signal and a driving related signal related to the driving pulse such that the phase difference is regulated to a predetermined value.

22 Claims, 13 Drawing Sheets

60 ⌐

HIGH PRECISION PHOTONIC DISTANCE METER CIRCUIT AND DISTANCE MEASURING METHOD

BACKGROUND OF THE INVENTION

Field of Invention

The present invention relates to a high precision distance meter circuit. Particularly, it relates to a high precision distance meter circuit having zero delay between the transmitter side and the receiver side.

Description of Related Art

The following prior art distance meters utilizes different methodologies from the present invention, including: CN110168398A, TWI544232B, and US20160363654A1.

FIG. 1 shows a schematic diagram of a prior art photonic distance meter 190. The laser diode LD emits a pulse of light for measuring the distance D between the distance meter and the object by receiving a TOF light pulse through the ACT pixel and measuring a time-of-fly (TOF) of the TOF light pulse emitted from the laser diode LD and reflected by the object. To synchronize the measuring starting time point and the light emitting time point, the REF pixel senses a reference light pulse emitted from the laser diode LD and reflected by the packaging case of the photonic distance meter 190, wherein the TOF light pulse and the reference light pulse are emitted at the same time from the laser diode LD.

The prior art of FIG. 1 is disadvantageous in that the need for the reference pixel and the chamber for reflecting the reference light pulse causes high cost and large physical dimension.

Compared to the prior art shown in FIG. 1, this invention provides a high precision distance meter without the need of the reference pixel and thus cost and physical dimension can be reduced.

SUMMARY OF THE INVENTION

From one perspective, the present invention provides a distance meter circuit, comprising: a driver circuit, configured to operably generate a driving pulse according to a measuring control signal to drive a photonic emission device to emit a first light pulse to an object; a first photonic sensing device, configured to operably generate a first light conversion signal in response to the first light pulse reflected by the object; a read-out circuit, configured to operably measure a first time-of-fly (TOF) of the first light pulse traveling from the photonic emission device to the first photonic sensing device through reflecting by the object according to a time difference between a measuring trigger signal and the first light conversion signal, wherein the measuring trigger signal is generated according to the measuring control signal; an adjustable delay circuit, characterized in one of the following: (a) providing an adjustable delay time between the measuring control signal and the measuring trigger signal, or (b) providing an adjustable delay time between the measuring control signal and the driving pulse; and a DLL control circuit, configured to operably, in a first measuring mode, generate a delay control signal by comparing a phase difference between the measuring trigger signal and a driving related signal which is related to the driving pulse, wherein the delay control signal adjusts the adjustable delay time such that the phase difference is regulated to a predetermined value.

In one preferred embodiment, the phase difference is regulated to 0.

In one preferred embodiment, when the adjustable delay circuit is characterized in (a), wherein the adjustable delay circuit is configured to generate the measuring trigger signal according to the measuring control signal, wherein a time difference between the measuring trigger signal and the measuring control signal includes at least the adjustable delay time.

In one preferred embodiment, the distance meter circuit further comprises a first synchronizing circuit for generating a pre-trigger signal synchronized to a clock signal according to the measuring control signal; wherein the adjustable delay circuit is configured to generate the measuring trigger signal according to the pre-trigger signal.

In one preferred embodiment, when the adjustable delay circuit is characterized in (a), wherein the distance meter circuit further comprises a first synchronizing circuit, wherein the adjustable delay circuit is configured to operably generate a delayed clock signal by delaying the clock signal with the adjustable delay time, wherein the measuring trigger signal is synchronized according to the delayed clock signal, thereby the phase difference is regulated to the predetermined value.

In one preferred embodiment, the driver circuit includes a driving transistor which is coupled to and is configured to drive the photonic emission device, wherein the driving related signal is electrically connected to a drain of the driving transistor, a gate of the driving transistor, or a terminal of the photonic emission device.

In one preferred embodiment, the driver circuit includes: a driving transistor which is coupled to and is configured to drive the photonic emission device; and a post buffer circuit, which includes at least one buffer and is configured to drive the driving transistor according to the measuring control signal, wherein the driving related signal is electrically connected to an output terminal of one of the at least one buffer.

In one preferred embodiment, the adjustable delay circuit is characterized in (b), wherein the driving pulse is generated according to a pre-driving signal, wherein the adjustable delay circuit is configured to generate the pre-driving signal according to the measuring control signal, wherein a time difference between the pre-driving signal and the measuring control signal includes at least the adjustable delay time, thereby the phase difference is regulated to the predetermined value.

In one preferred embodiment, the distance meter circuit of further comprises a fixed delay circuit which is configured to provide a predetermined delay time between the measuring control signal and the measuring trigger signal.

In one preferred embodiment, a time difference between the measuring control signal and the measuring trigger signal is longer than a time difference between the measuring control signal and the driving pulse when the adjustable delay time is configured as a minimum delay time.

In one preferred embodiment, adjustable delay circuit is characterized in either (a) or (b).

In one preferred embodiment, the distance meter circuit further comprises: a second photonic sensing device which is configured to operably generate a second light conversion signal in response to a second light pulse generated by a predetermined reflector reflecting the second light pulse; wherein in a second measuring mode, the read-out circuit is selectable to be configured to operably measure the first time-of-fly of the first light pulse according to a time difference between the second light conversion signal and the first light conversion signal.

In one preferred embodiment, when the adjustable delay circuit is characterized in (b), wherein the distance meter circuit further comprises a second synchronizing circuit, wherein the adjustable delay circuit is configured to operably generate a delayed clock signal by delaying the clock signal with the adjustable delay time, wherein the driving pulse is synchronized according to the delayed clock signal by the second synchronizing circuit, thereby the phase difference is regulated to the predetermined value.

From another perspective, the present invention provides a distance measuring method, comprising: generating a driving pulse to drive a photonic emission device to emit a first light pulse to an object; generating a first light conversion signal in response to the first light pulse reflected by the object; measuring a first time-of-fly (TOF) of the first light pulse traveling from the photonic emission device to the first photonic sensing device through reflecting by the object according to a time difference between a measuring trigger signal and the first light conversion signal; providing an adjustable delay time for (a) generating the measuring trigger signal, or for (b) generating the driving pulse; and adjusting the adjustable delay time such that the phase difference is regulated to a predetermined value.

In one preferred embodiment, the distance measuring method further comprises: generating a pre-trigger signal synchronized to a clock signal; delaying the pre-trigger signal with the adjustable delay time generate the measuring trigger signal.

In one preferred embodiment, when the adjustable delay time is provided for (a), the step of providing the adjustable delay time includes: delaying a clock signal to generate a delayed clock signal; and synchronizing the measuring trigger signal by the delayed clock signal, thereby the phase difference is regulated to the predetermined value.

In one preferred embodiment, when the adjustable delay time is provided for (b), wherein the driving pulse is generated according to a pre-driving signal, wherein the step of providing the adjustable delay time includes: delaying the pre-driving signal by the adjustable delay time for generating the driving pulse, thereby the phase difference is regulated to the predetermined value.

In one preferred embodiment, the distance measuring method further comprises: providing a predetermined delay time for generating the measuring trigger signal.

In one preferred embodiment, the predetermined delay time is long to an extent that the measuring trigger signal is later than the driving pulse when the adjustable delay time is configured as a minimum delay time.

In one preferred embodiment, when the adjustable delay time is provided for (b), wherein the distance meter circuit further comprises a second synchronizing circuit, wherein the adjustable delay circuit is configured to operably generate a delayed clock signal by delaying the clock signal with the adjustable delay time, wherein the driving pulse is synchronized according to the delayed clock signal by the second synchronizing circuit, thereby the phase difference is regulated to the predetermined value.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
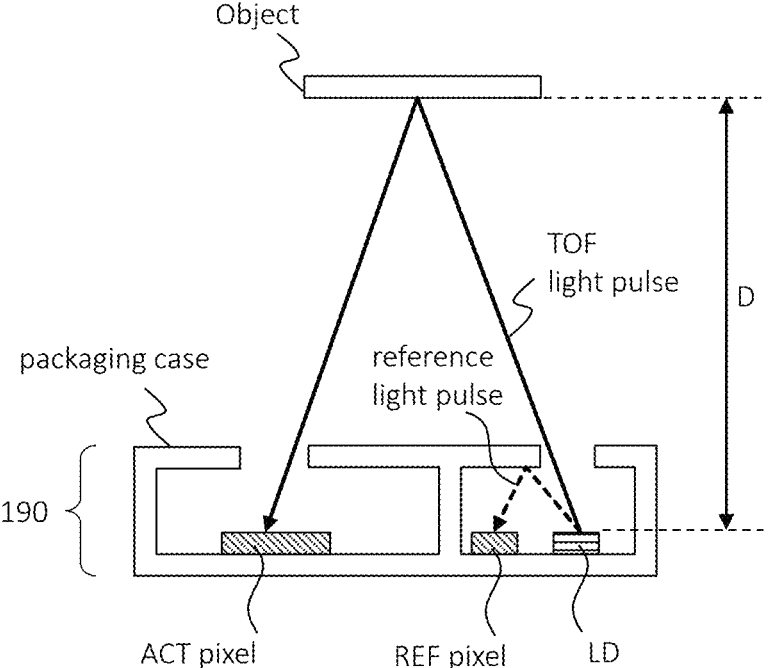
FIG. 1 shows a schematic diagram of a prior art photonic distance meter.
Figure 2:
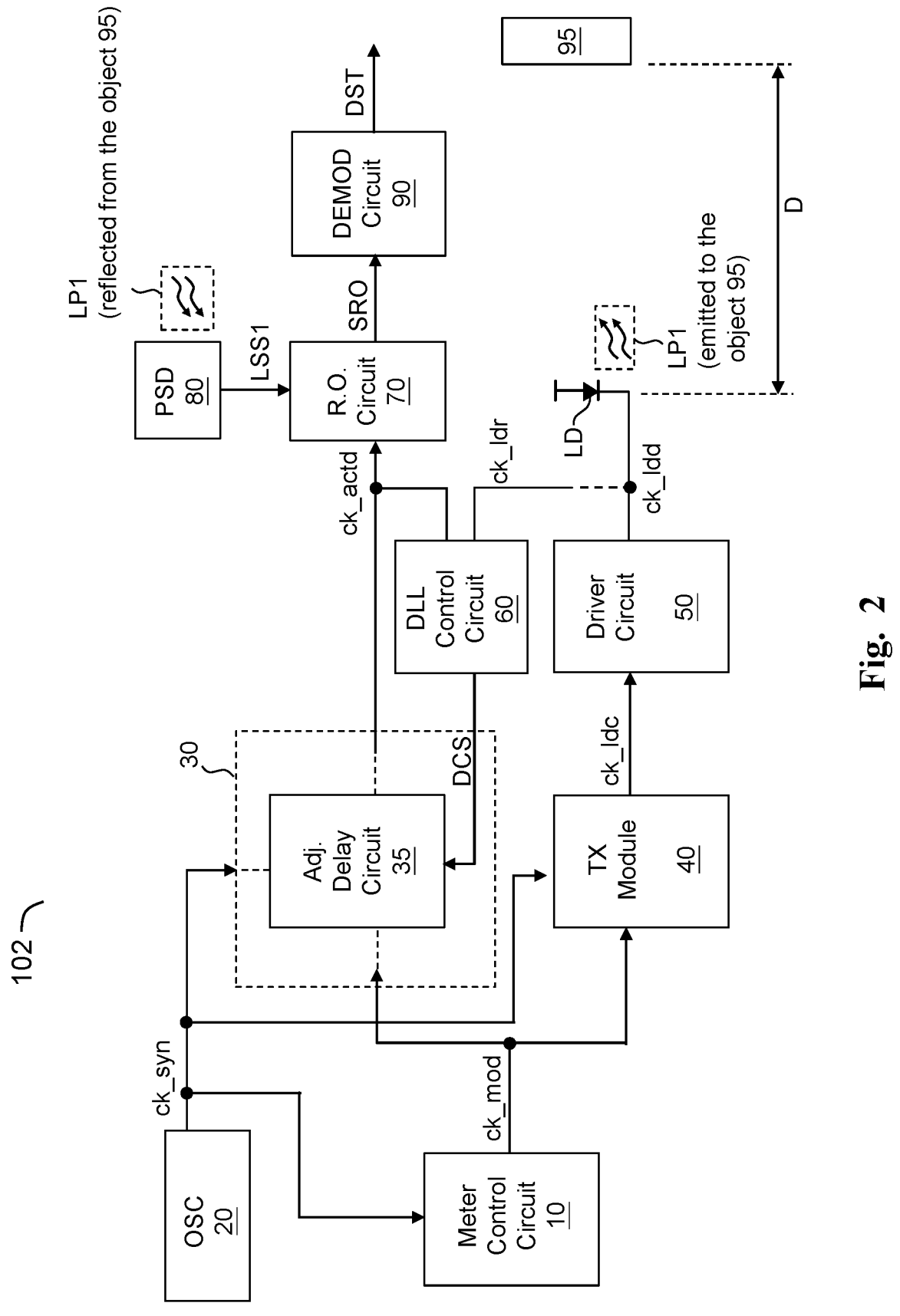
FIG. 2 shows a block diagram of one embodiment of the distance meter circuit according to the present invention.
Figure 3:
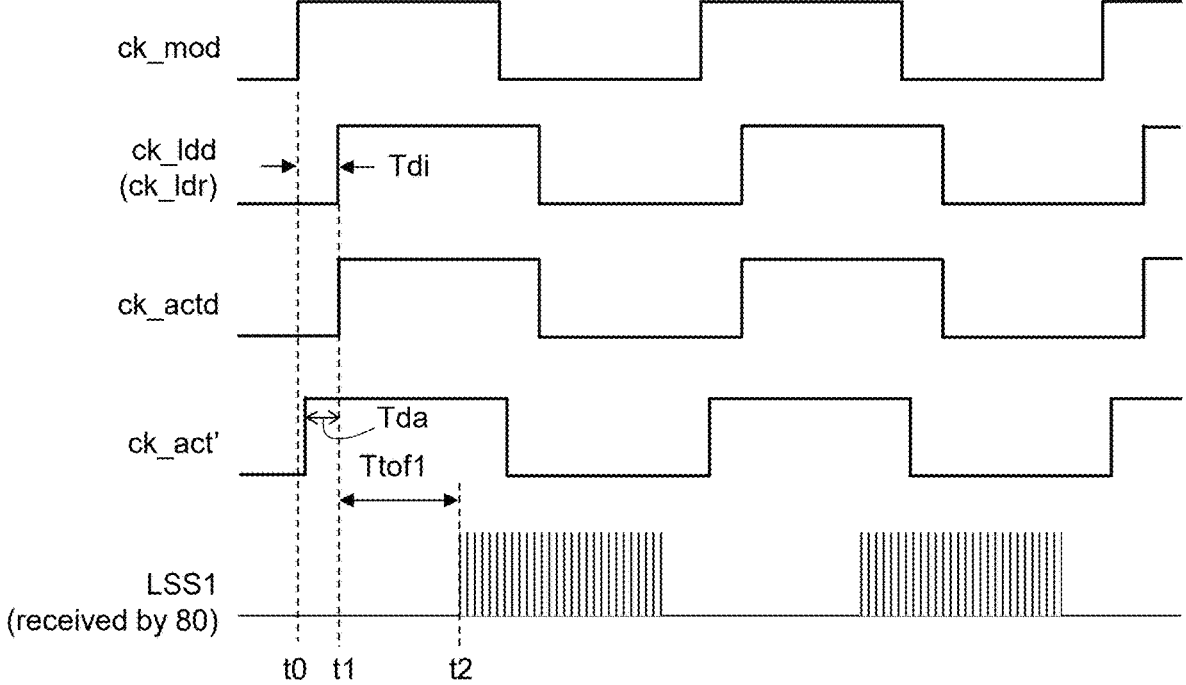
FIG. 3 shows an embodiment of operating waveforms according to the present invention.

FIG. 2 shows a block diagram of one embodiment of the distance meter circuit according to the present invention. In one embodiment, in the distance meter circuit 102, an oscillator (OSC) provides a clock signal ck_syn for synchronizing circuitries inside the distance meter circuit 102. A meter control circuit 10 generates a measuring control signal ck_mod for initiating distance measuring. The transmitter module 40 (noted as TX module) is configured to generate a pre-driving signal ck_ldc according to the measuring control signal ck_mod and the clock signal ck_syn. A driver circuit 50 is configured to generate a driving pulse ck_ldd according to the pre-driving signal ck_ldc to drive a photonic emission device LD (for example a laser diode) to emit a first light pulse LP1. FIG. 3 shows an embodiment of operating waveforms according to the present invention. The measuring control signal ck_mod starts at time point t0. After delay time Tdi caused by the circuitries (e.g. transmitter module 40, driver circuit 50, and etc.) along the transmitter side signal path, the light pulse LP1 starts to be emitted at time point t1, and travels to an object and is reflected by the object 95 to reach a first photonic sensing device 80 at time point t2. The distance between the distance meter 102 (more specifically the photonic emission device LD) can be estimated by measuring the time-of-fly Ttof1 (i.e. the time difference between the time point t1 and the time point t2.

In one embodiment, the first photonic sensing device 80 is configured to generate a first light conversion signal LSS1 in response to the first light pulse LP1 reflected by the object 95. The first light conversion signal LSS1 for example can be a series of pulses, wherein the density of the pulses is positively related to the intensity of the first light pulse LP1 shedding on the first photonic sensing device 80.

A receiver module 30 is configured to generate a measuring trigger signal ck_actd according to the measuring control signal ck_mod. The measuring trigger signal ck_actd (for example the positive edge) triggers a read-out circuit (noted as R.O. circuit as shown in FIG. 2) to start sensing the first light conversion signal LSS1 to generate a corresponding first light sensing signal SRO. In one embodiment, the first light sensing signal SRO includes digital pulses corresponding to the first light conversion signal LSS1. In one embodiment, the first light sensing signal SRO is demodulated by a demodulation circuit 90 (noted as DEMOD circuit) to calculate the distance D between the object 95 and the distance meter 102 by for example indirect TOF demodulation method or direct TOF demodulation method and generate a distance signal DST representing the calculated distance.

In one embodiment, the distance meter circuit 102 further comprises an adjustable delay circuit 35 (noted as Adj. Delay Circuit) and a DLL (delay locked loop) control circuit 60. As shown in FIG. 2, in one embodiment, the adjustable delay circuit 35 is configured to be located in the receiver side, i.e. the receiver module 30 includes the adjustable delay circuit 35. From one perspective, in this embodiment, the adjustable delay circuit 35 is configured to provide an adjustable delay time Tda between the measuring control signal ck_mod and the measuring trigger signal ck_actd. Note that the delay time between the measuring control signal ck_mod and the measuring trigger signal ck_actd may be longer than the adjustable delay time Tda due to delay time caused by other circuitries inside the receiver module 30.

The DLL control circuit 60 is configured to operably, in a first measuring mode, generate a delay control signal DCS by comparing a phase difference between the measuring trigger signal ck_actd and a driving related signal ck_ldr which is related to the driving pulse ck_ldd. The delay control signal DCS is configured to adjust the adjustable delay time Tda of the adjustable delay circuit 35, such that the phase difference is regulated to a predetermined value. In other words, the DLL control circuit 60 and the adjustable delay circuit 35 form a delay locked loop which can control the phase difference by feedback control scheme. Note that the phase difference can be between the positive edges or the negative edges of the measuring trigger signal ck_actd and a driving related signal ck_ldr. In one preferred embodiment, the phase difference is controlled to be 0. Also referring to FIG. 3, in one embodiment, the rising edge of the measuring trigger signal ck_actd and the rising edge of the aligned driving related signal ck_ldr are controlled to be aligned (i.e. the phase difference is 0). In other words, a time point when the first light pulse LP1 starts to be emitted and a time point for the read-out circuit 70 for starting sensing the first light conversion signal LSS1 are aligned. Therefore, the distance D can be precisely calculated by eliminating errors caused by the aforementioned phase difference when measuring the first time-of-fly Ttof1.

Figure 4:
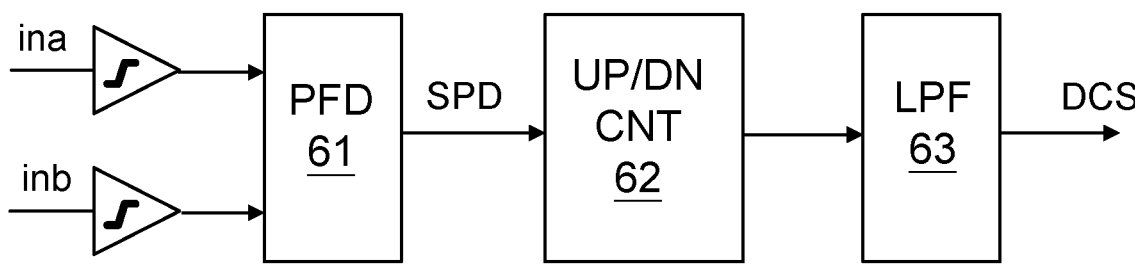
FIG. 4 shows a schematic diagram of one embodiment of the DLL control circuit 60 according to the present invention.

FIG. 4 shows a schematic diagram of one embodiment of the DLL control circuit 60 according to the present invention. In this typical embodiment, the DLL control circuit 60 includes phase frequency detector 61 (noted as PFD), an up/down counter 62 (noted as UP/DN CNT) and a low-pass filter (LPF) 63. The phase frequency detector 61 detects the phase difference between input signals ina and inb to generate a phase difference signal SPD. In correspondence with FIG. 2, the input signal ina can be corresponded to the measuring trigger signal ck_actd, and the input signal inb can be corresponded to the driving related signal ck_ldr. The up/down counter 62 and the low-pass filter 63 are configured to generate the delay control signal DCS according to the phase difference signal SPD. The detailed operation of the DLL control circuit is known to those in the art and will not be repeated herein.

Figure 5:
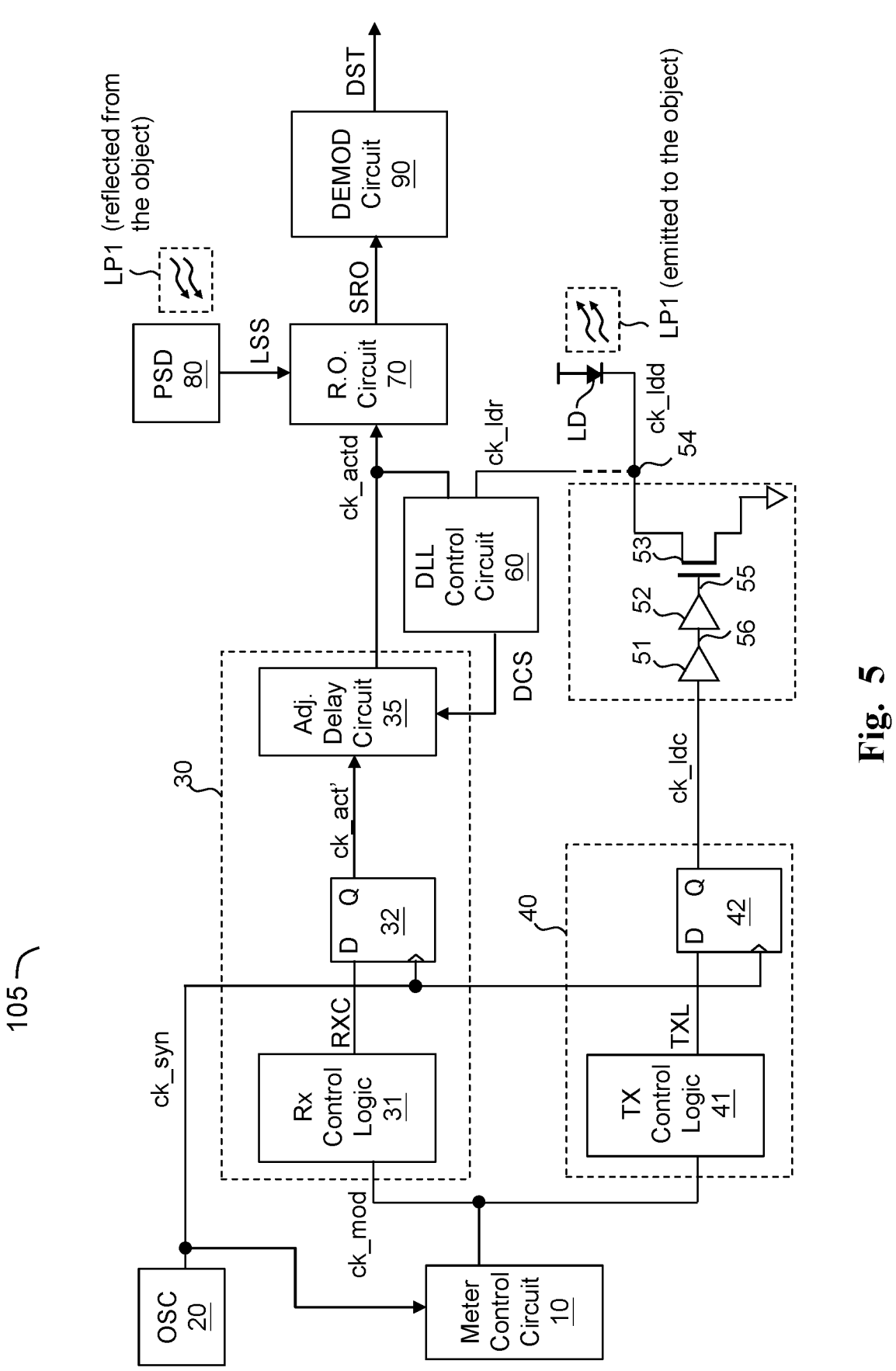
FIG. 5 shows a more specific block and schematic diagram of one embodiment of the distance meter circuit according to the present invention.

FIG. 5 shows a more specific block and schematic diagram of one embodiment of the distance meter circuit according to the present invention. In this embodiment, the receiver module 30 includes a receiver control logic 31 (noted as RX Control Logic), a first synchronizing circuit 32. The receiver control logic 31 generates a receiver control signal RXC according to the measuring control signal ck_mod. The receiver control signal RXC is then synchronized with the clock signal ck_syn by the first synchronizing circuit 32 to generate a pre-trigger signal ck_act'. The first synchronizing circuit 32 can be for example a D-type flip-flop as shown in FIG. 5, or any other digital synchronizing circuit. In this embodiment, the first synchronizing circuit 32 is configured to delay the pre-trigger signal ck_act' with the adjustable delay time Tda to generate the measuring trigger signal ck_actd.

Figure 6A:
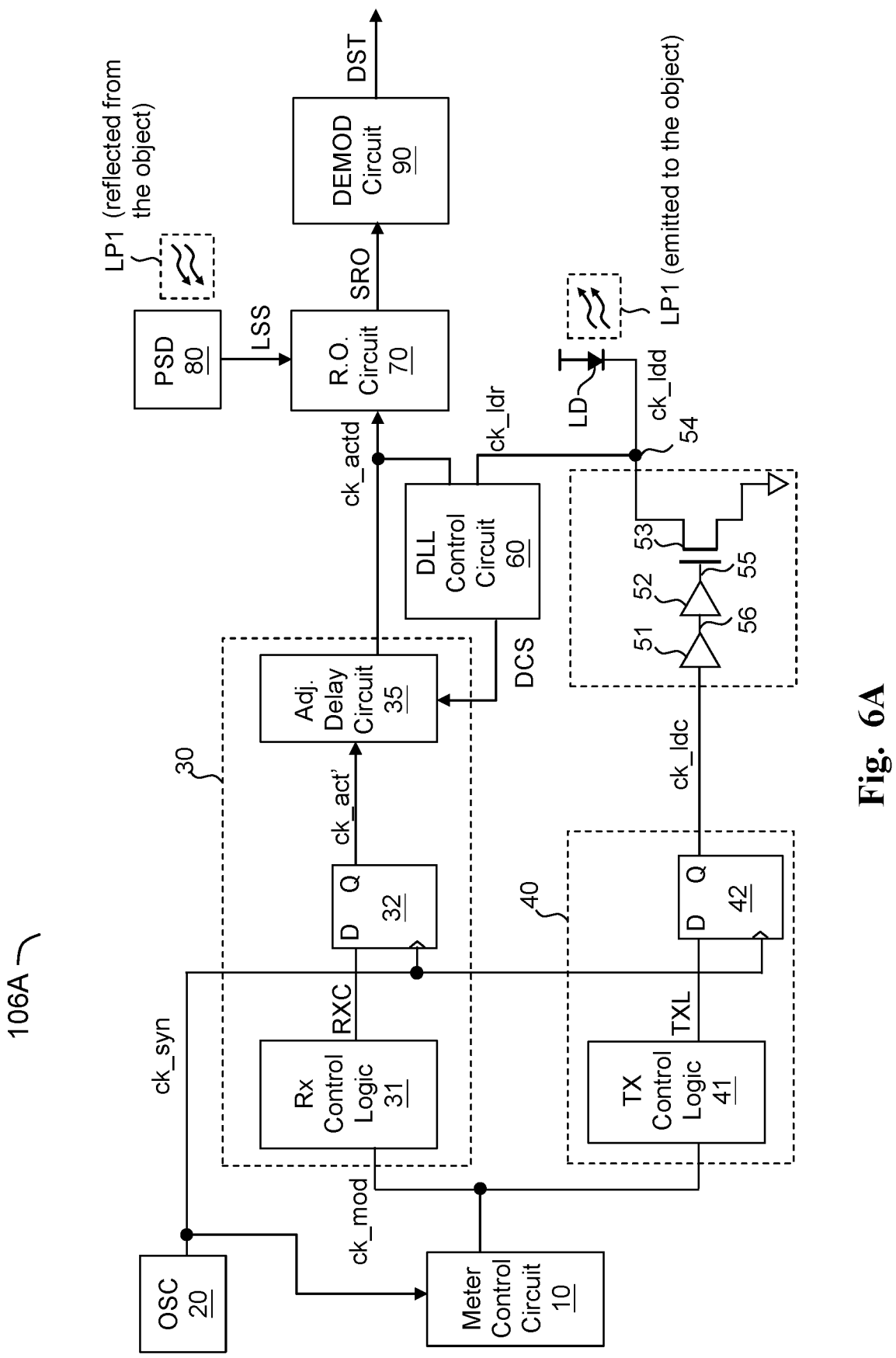
FIG. 6A-6C shows more specific schematic diagrams of one embodiment of the driver circuit according to the present invention.
Figure 6B:
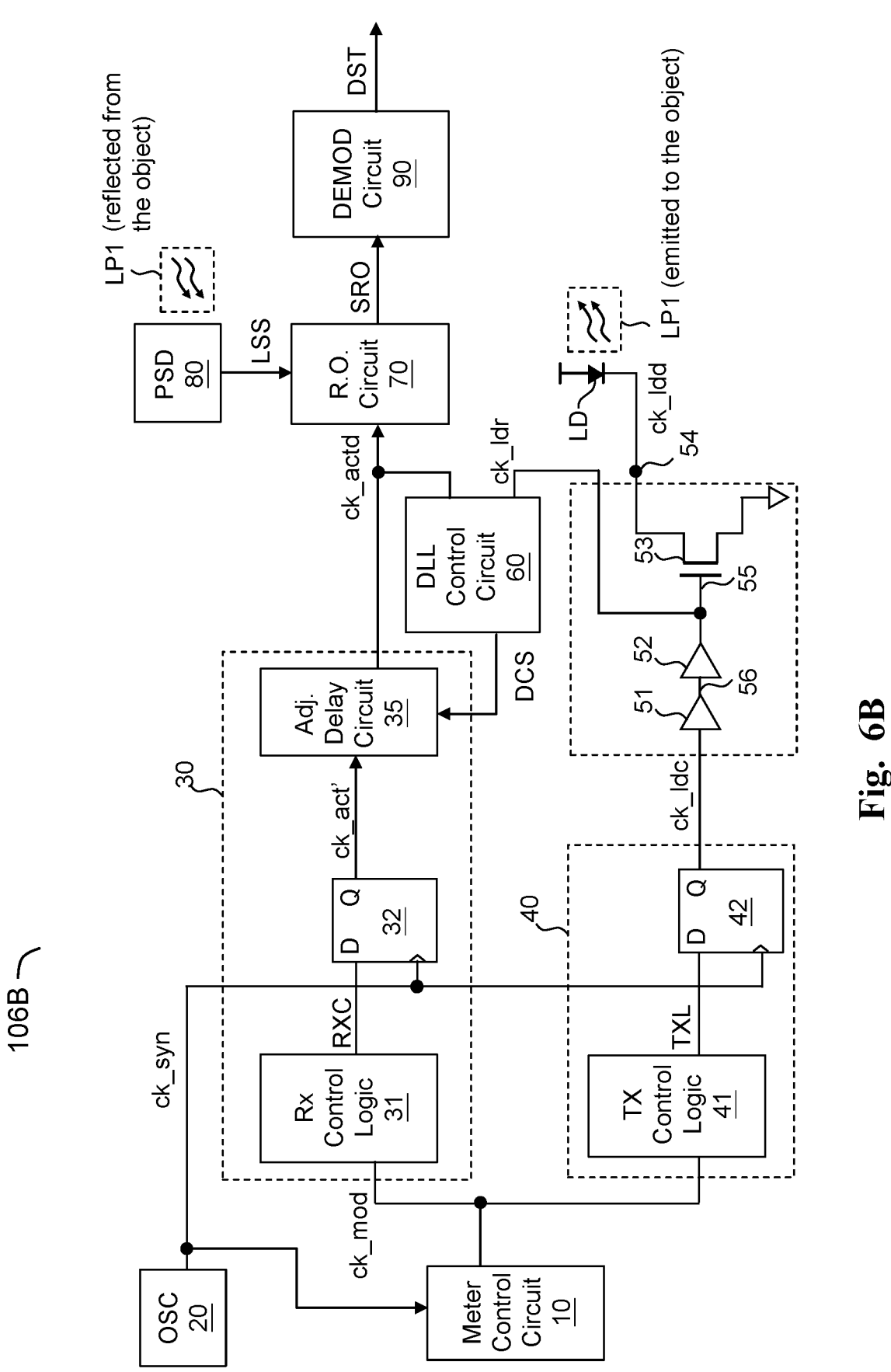
Figure 6C:
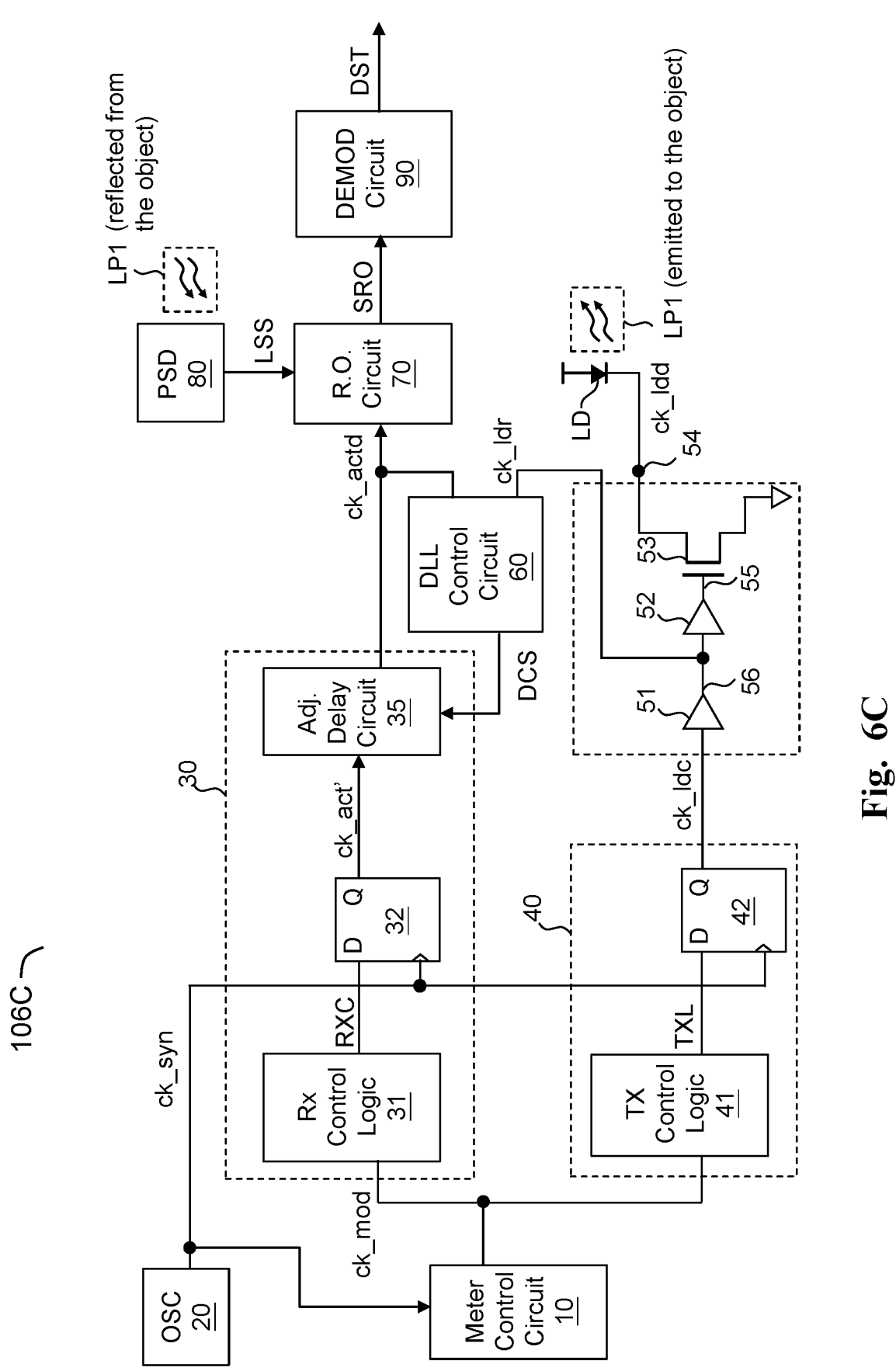

FIG. 6A-6C shows more specific schematic diagrams of one embodiment of the driver circuits and the distance meter circuits (106A-106C) according to the present invention. In one embodiment, the driver circuit 50 includes a driving transistor 53 which is coupled to and is configured to drive the photonic emission device LD. In one embodiment, the driving related signal ck_ldr is the driving pulse ck_ldd. In other words, the driving related signal ck_ldr is electrically connected to the drain (54) of the driving transistor 53 (FIG. 6A). In this embodiment, the drain 54 of the driving transistor 53 is electrically connected to the cathode of the laser diode LD.

In one embodiment, as shown in FIG. 6B, the driving related signal ck_ldr is electrically connected to the gate of the driving transistor 53 (FIG. 6B). In one embodiment, as shown in FIG. 6C, the driver circuit 50 includes at least one buffer (e.g. buffer 51, buffer 52). The buffer 51 and the buffer 52 are configured to provide higher driving capability to drive the driving transistor 53 according to the measuring control signal ck_mod. In one particular embodiment, the buffer 51 and the buffer 52 are configured to drive the driving transistor 53 according to the pre-driving signal ck_ldc. In one embodiment, the driving related signal ck_ldr is electrically connected to an output of the buffer 51 (FIG. 6C).

Figure 7:
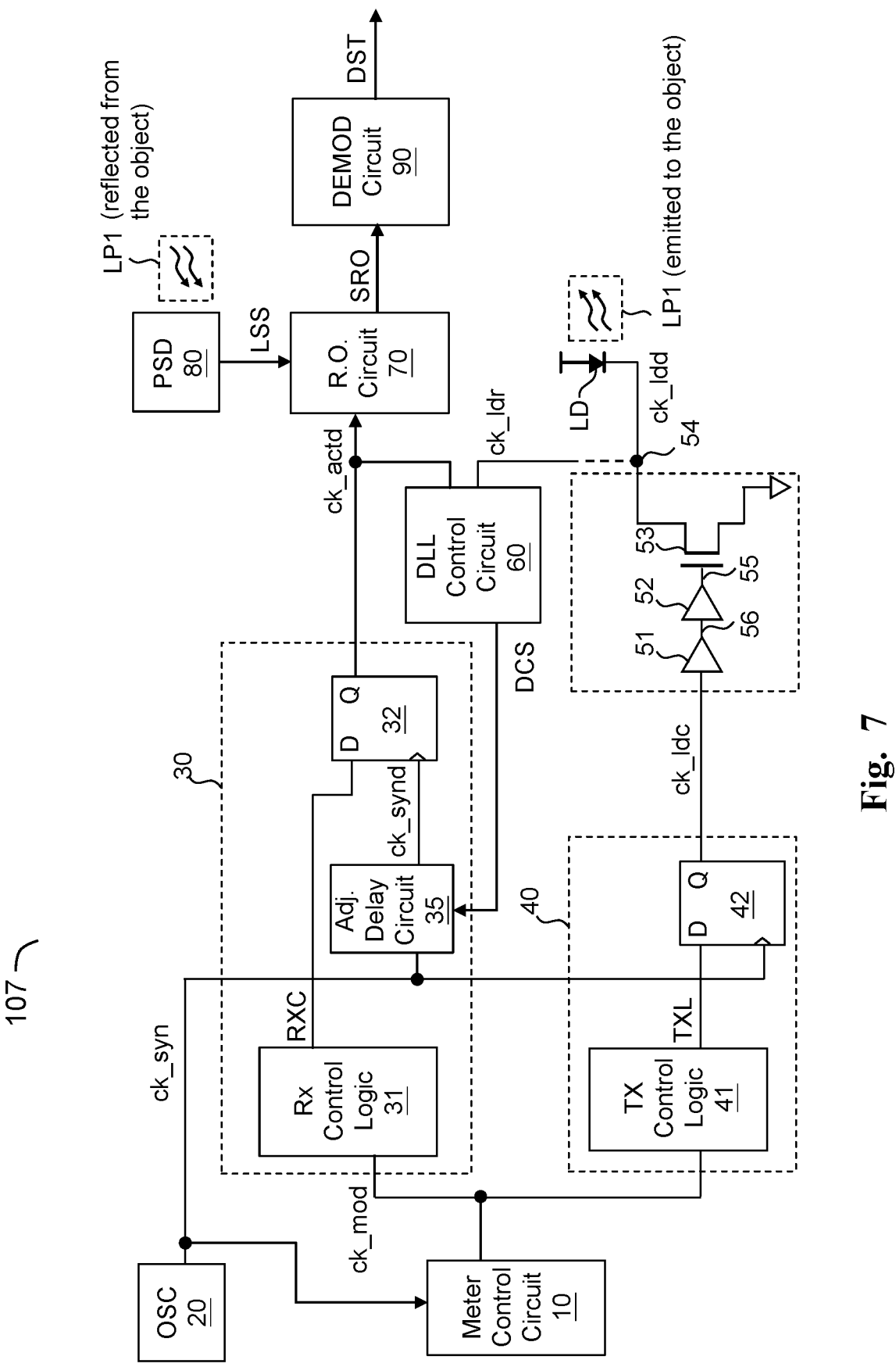
FIG. 7 shows a more specific block and schematic diagram of one embodiment of the distance meter circuit according to the present invention.

FIG. 7 shows a more specific block and schematic diagram of one embodiment of the distance meter circuit (107) according to the present invention. In one embodiment, the transmitter module 40 includes a transmitter control logic 41 (noted as TX control logic) and a second synchronizing circuit 42 (e.g. a D-type flip-flop). The transmitter control logic 41 generates a transmitting control signal TXL according to the measuring control signal ck_mod. The transmitting control signal TXL is synchronized by the second synchronizing circuit 42 according to the clock signal ck_syn to generate the pre-driving signal ck_ldc.

Still referring to FIG. 7, in one embodiment, the adjustable delay circuit 35 is configured to operably generate a delayed clock signal ck_synd by delaying the clock signal ck_syn with the adjustable delay time Tda. In this embodiment, the measuring trigger signal ck_actd is synchronized according to the delayed clock signal ck_synd. Thus, the phase of the measuring trigger signal ck_actd can still be controlled by the DLL control circuit 60 adjusting the adjustable delay time Tda, so that the phase difference between the measuring trigger signal ck_actd and the driving related signal ck_ldr can be regulated to the predetermined value by the DLL control circuit 60.

Figure 8:
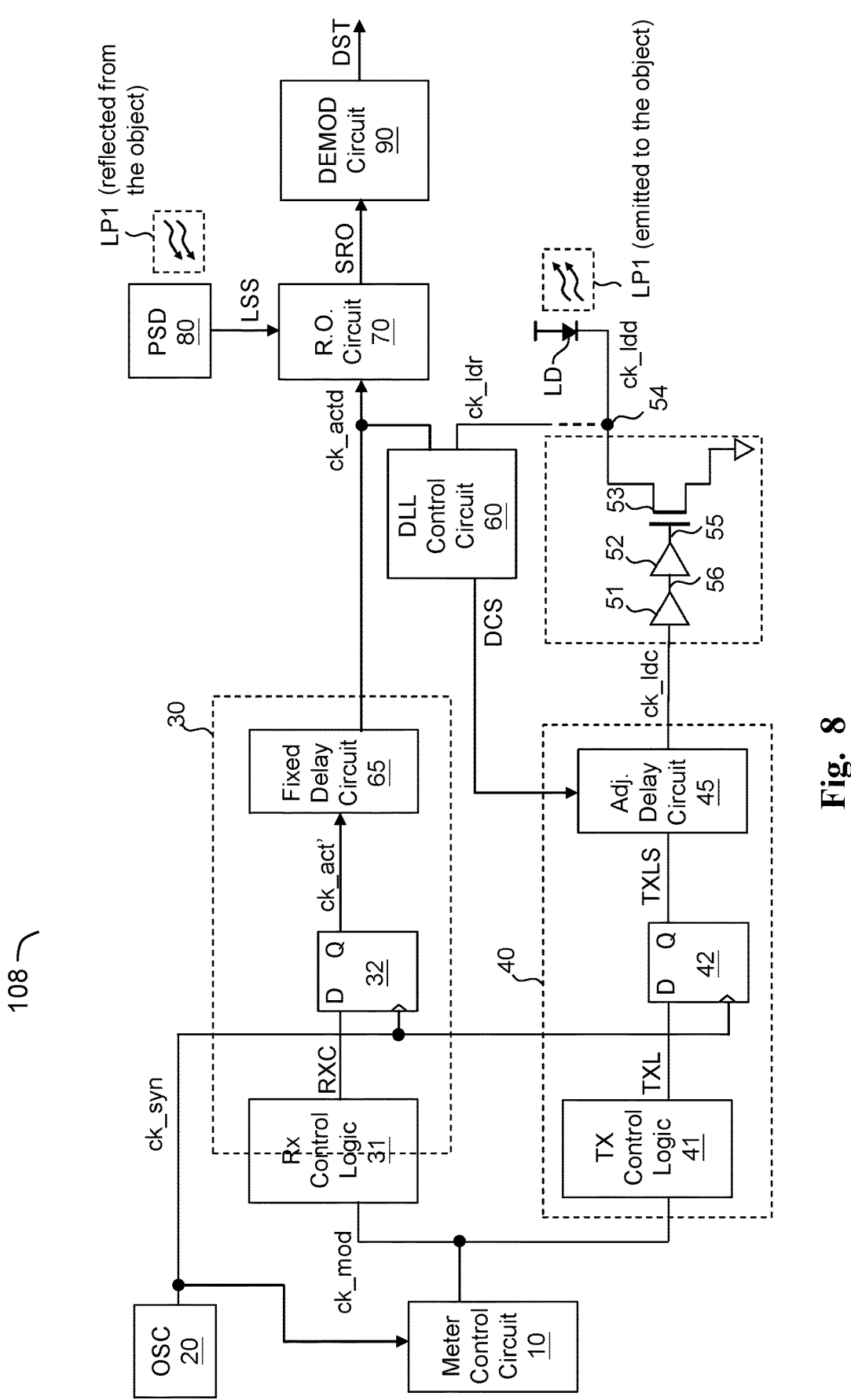
FIG. 8 shows a more specific block and schematic diagram of one embodiment of the distance meter circuit according to the present invention.
Figure 9:
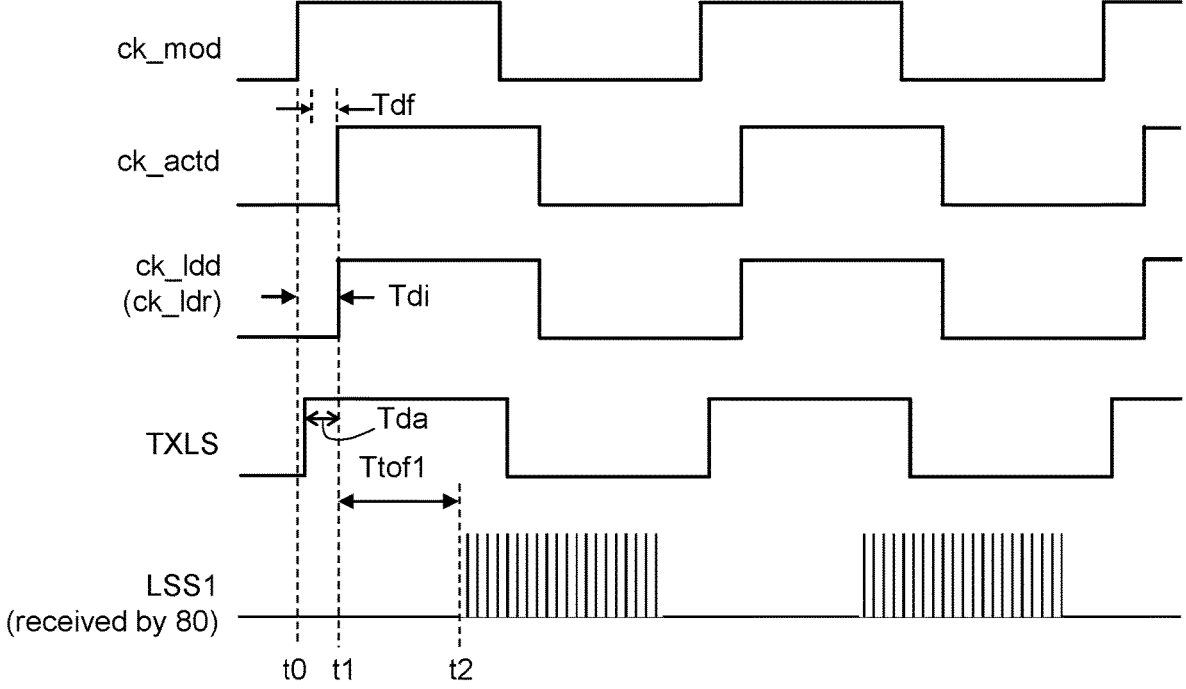
FIG. 9 shows an embodiment of operating waveforms according to the present invention.

FIG. 8 shows a more specific block and schematic diagram of one embodiment of the distance meter circuit according to the present invention. Also refer to FIG. 9 which shows an embodiment of operating waveforms according to the present invention. The distance meter circuit 108 is similar to the distance meter circuit 105 and differs in that the adjustable delay circuit is alternatively configured to be located in the transmitter side, i.e. the transmitter module 40 includes an adjustable delay circuit From one perspective, in this embodiment, the adjustable delay circuit 45 is configured to provide an adjustable delay time Tda between the measuring control signal ck_mod and the driving pulse ck_ldd. Note that the delay time between the measuring control signal ck_mod and the driving pulse ck_ldd may be longer than the adjustable delay time Tda due to delay time caused by other circuitries inside the transmitter side circuitry.

Still referring to FIG. 8, in one preferred embodiment, the adjustable delay circuit 45 is configured to delay a synchronized driving control signal TXLS with the adjustable delay time Tda to generate the pre-driving signal ck_ldc. In one embodiment, the D-type flip-flop 42 generates the synchronized driving control signal TXLS according to the transmitting control signal TXL.

In this embodiment, the phase of the driving related signal ck_ldr is controlled by the DLL control circuit 60 adjusting the adjustable delay time Tda, so that the phase difference between the measuring trigger signal ck_actd and the driving related signal ck_ldr can be regulated to the predetermined value by the DLL control circuit 60.

Still referring to FIG. 8, in one preferred embodiment, the distance meter circuit 108 further comprises a fixed delay circuit 65 which is configured to provide a predetermined delay time Tdf between the measuring control signal ck_mod and the measuring trigger signal ck_actd. In one preferred embodiment, the time difference between the measuring control signal ck_mod and the measuring trigger signal ck_actd is longer than the time difference between the measuring control signal ck_mod and the driving pulse ck_ldd when the adjustable delay time Tda is adjusted to a minimum delay time.

Figure 10:
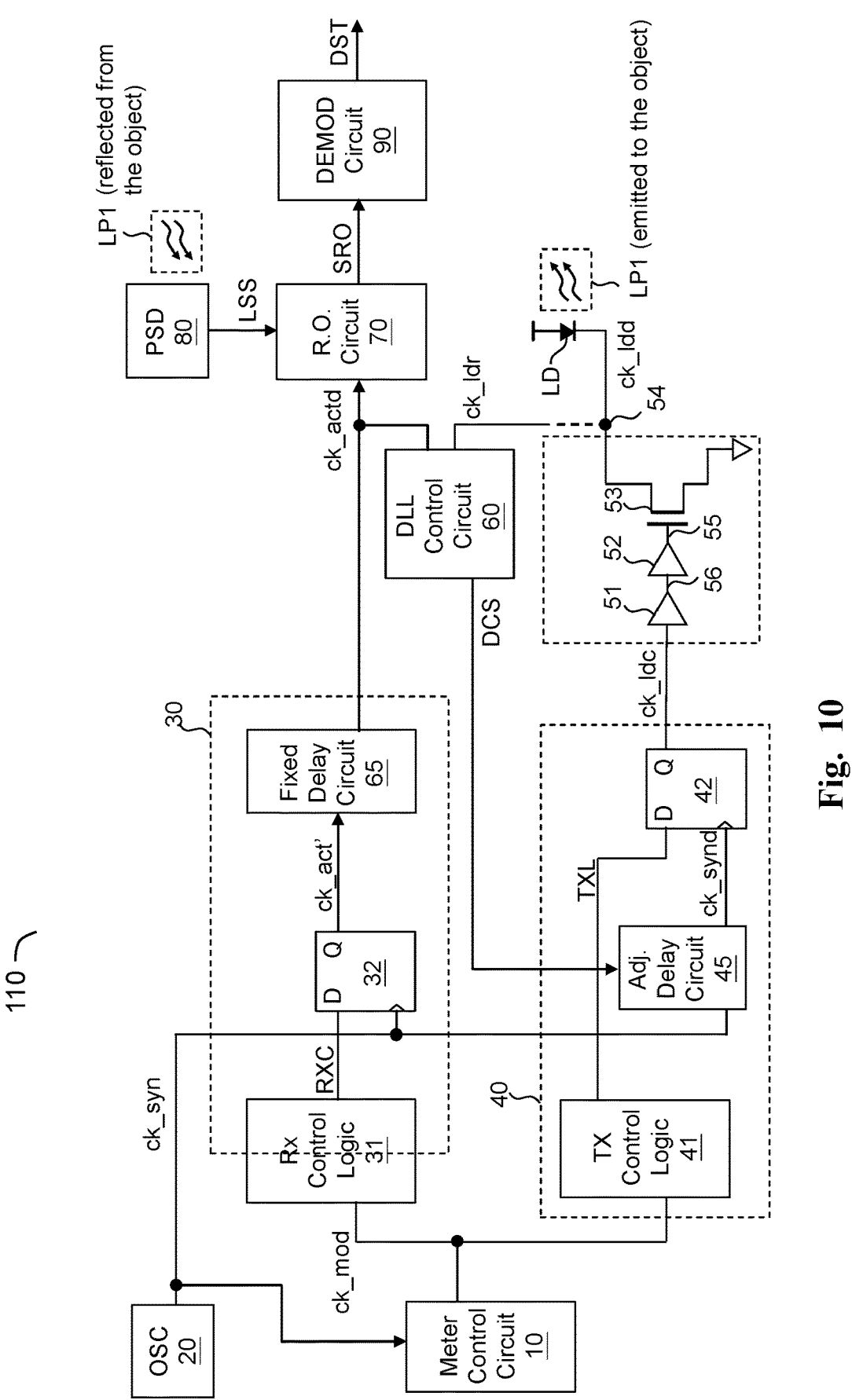
FIG. 10 shows a more specific block and schematic diagram of one embodiment of the distance meter circuit according to the present invention.

FIG. 10 shows a more specific block and schematic diagram of one embodiment of the distance meter circuit according to the present invention. The distance meter circuit 110 is similar to the distance meter circuit 105 and the distance meter circuit 108 and differs in that the adjustable delay circuit 45 is configured to operably generate a delayed clock signal ck_synd by delaying the clock signal ck_syn with the adjustable delay time Tda. In this embodiment, the driving related signal ck_ldr is synchronized according to the delayed clock signal ck_synd. Thus, the phase of the measuring trigger signal ck_actd can still be controlled by the DLL control circuit 60 adjusting the adjustable delay time Tda, so that the phase difference between the measuring trigger signal ck_actd and the driving related signal ck_ldr can be regulated to the predetermined value by the DLL control circuit 60.

Figure 11:
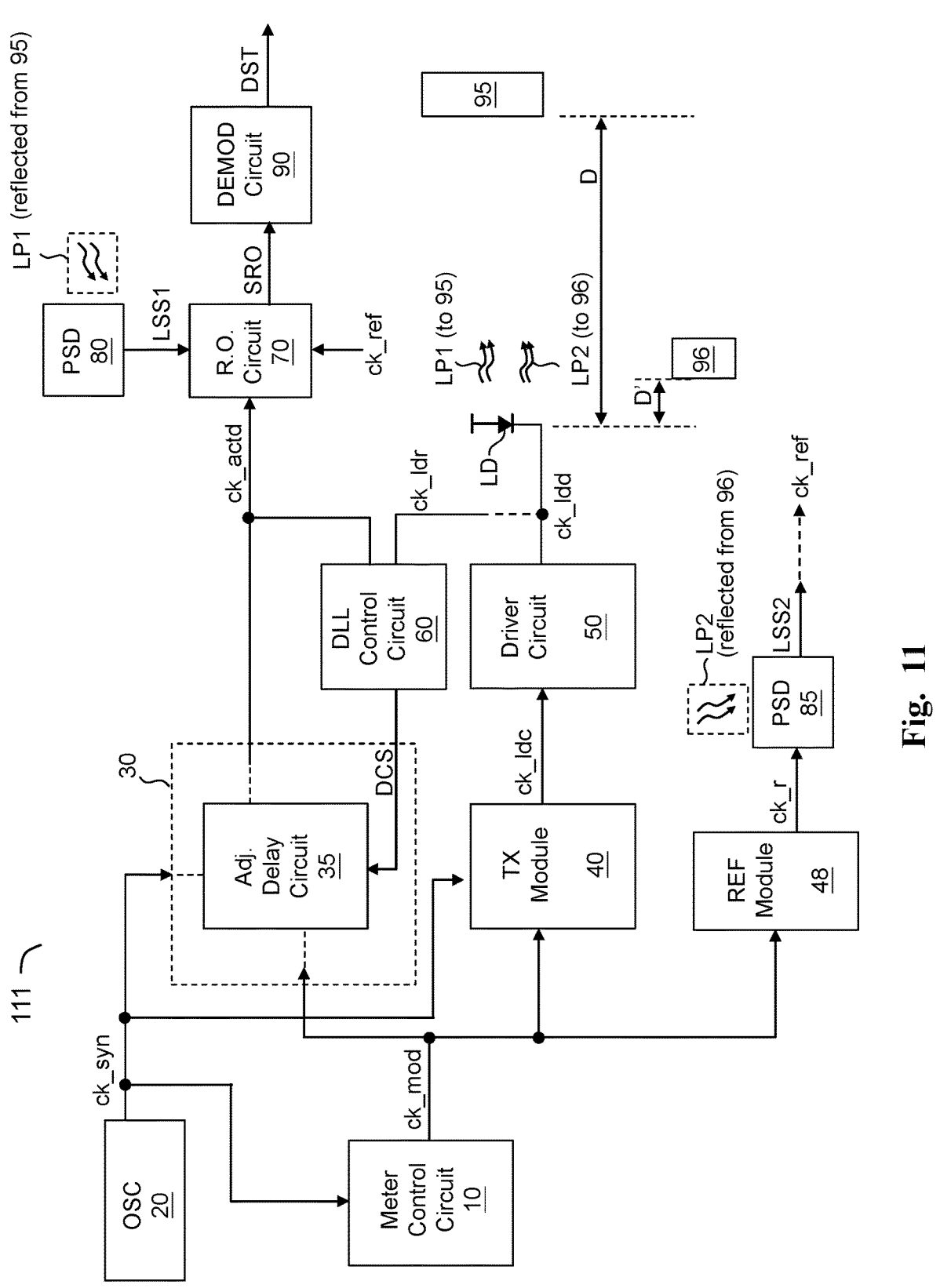
FIG. 11 shows a more specific block and schematic diagram of one embodiment of the distance meter circuit according to the present invention.

FIG. 11 shows a more specific block and schematic diagram of one embodiment of the distance meter circuit according to the present invention. The distance meter circuit 111 is similar to the distance meter circuit 102. The distance meter circuit 111 further comprises a reference module 48 and a second photonic sensing device 85. The reference module 48 generates a control signal ck_r according to the measuring control signal ck_mod to control the sensing of a second light conversion signal LSS2. The second photonic sensing device 85 is configured to operably generate a second light conversion signal LSS2 in response to a second light pulse LP2 generated by a predetermined reflector 96 reflecting the second light pulse LP2. Note that the second light pulse LP2 and the first light pulse LP1 are emitted from the laser diode LD at the same time. The distance between the predetermined reflector 96 and the photonic emission device LD is a predetermined distance D'. In one embodiment, a second time-of-fly of the second light pulse LP2 traveling to the second photonic sensing device 85 is short to an extent that the second time-of-fly is negligible compared to the first time-of-fly Ttof1. In other words, the predetermined distance D' is much shorter than the distance D of the object 95. In one embodiment, the second time-of-fly of the second light pulse LP2 can be offset by a fixed delay time.

In this embodiment, the read-out circuit 70 can select the measuring trigger signal ck_actd or a reference trigger signal ck_ref (in a second measuring mode), by a user or by a predetermined program, as the actual trigger signal for starting the measurement of the first time-of-fly Ttof1. The measuring trigger signal ck_actd can be generated by any of the control schemes by the adjustable delay circuit 35 and the DLL control circuit 60 as described above. The reference trigger signal ck_ref is generated according to the second light conversion signal LSS2.

In summary, to improve the precision of photonic distance measurement, a delay locked loop is employed to mitigate the phase difference between the time point for measurement and the time point of emission of the light pulse. The adjustable delay circuit of the delay locked loop can be located in the receiver signal path or in the transmitter signal path or in the clock signal path for locking the phase difference.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A distance meter circuit, comprising:

a driver circuit, configured to operably generate a driving pulse according to a measuring control signal to drive a photonic emission device to emit a first light pulse to an object;

a first photonic sensing device, configured to operably generate a first light conversion signal in response to the first light pulse reflected by the object;

a read-out circuit, configured to operably measure a first time-of-fly (TOF) of the first light pulse traveling from the photonic emission device to the first photonic sensing device through reflecting by the object according to a time difference between a measuring trigger signal and the first light conversion signal, wherein the measuring trigger signal is generated according to the measuring control signal;

an adjustable delay circuit, characterized in one of the following: (a) providing an adjustable delay time between the measuring control signal and the measuring trigger signal, or (b) providing an adjustable delay time between the measuring control signal and the driving pulse; and a DLL (Delay Locked Loop) control circuit, configured to operably, in a first measuring mode, generate a delay control signal by comparing a phase difference between the measuring trigger signal and a driving related signal which is generated according to the measuring control signal and is related to the driving pulse, wherein the delay control signal adjusts the adjustable delay time, such that the DLL control circuit and the adjustable delay circuit form a delay locked loop which regulates the phase difference to a predetermined value by feedback control scheme;

wherein the DLL control circuit includes:

a phase frequency detector, configured to detect the phase difference between the measuring trigger signal and the driving related signal to generate a phase difference signal;

an up/down counter, configured to perform up counting or down counting according to the phase difference signal; and a low-pass filter, configured to low-pass-filter an output of the up/down counter to generate the delay control signal.

2. The distance meter circuit of claim 1, wherein the phase difference is regulated to 0.

3. The distance meter circuit of claim 1, when the adjustable delay circuit is characterized in (a), wherein the adjustable delay circuit is configured to generate the measuring trigger signal according to the measuring control signal, wherein a time difference between the measuring trigger signal and the measuring control signal includes at least the adjustable delay time.

4. The distance meter circuit of claim 3, wherein the distance meter circuit further comprises a first synchronizing circuit for generating a pre-trigger signal synchronized to a clock signal according to the measuring control signal;

wherein the adjustable delay circuit is configured to generate the measuring trigger signal according to the pre-trigger signal.

5. The distance meter circuit of claim 1, when the adjustable delay circuit is characterized in (a), wherein the distance meter circuit further comprises a first synchronizing circuit, wherein the adjustable delay circuit is configured to operably generate a delayed clock signal by delaying the clock signal with the adjustable delay time, wherein the measuring trigger signal is synchronized according to the delayed clock signal, thereby the phase difference is regulated to the predetermined value.

6. The distance meter circuit of claim 1, wherein the driver circuit includes a driving transistor which is coupled to and is configured to drive the photonic emission device, wherein the driving related signal is electrically connected to a drain of the driving transistor, a gate of the driving transistor, or a terminal of the photonic emission device.

7. The distance meter circuit of claim 1, wherein the driver circuit includes:

a driving transistor which is coupled to and is configured to drive the photonic emission device; and a post buffer circuit, which includes at least one buffer and is configured to drive the driving transistor according to the measuring control signal, wherein the driving related signal is electrically connected to an output terminal of one of the at least one buffer.

8. The distance meter circuit of claim 1, wherein the adjustable delay circuit is characterized in (b), wherein the driving pulse is generated according to a pre-driving signal, wherein the adjustable delay circuit is configured to generate the pre-driving signal according to the measuring control signal, wherein a time difference between the pre-driving signal and the measuring control signal includes at least the adjustable delay time, thereby the phase difference is regulated to the predetermined value.

9. The distance meter circuit of claim 8, further comprising a fixed delay circuit which is configured to provide a predetermined delay time between the measuring control signal and the measuring trigger signal.

10. The distance meter circuit of claim 9, wherein a time difference between the measuring control signal and the measuring trigger signal is longer than a time difference between the measuring control signal and the driving pulse when the adjustable delay time is configured as a minimum delay time.

11. The distance meter circuit of claim 1, wherein adjustable delay circuit is characterized in either (a) or (b).

12. The distance meter circuit of claim 1, further comprising:

a second photonic sensing device which is configured to operably generate a second light conversion signal in response to a second light pulse generated by a predetermined reflector reflecting the second light pulse;

wherein in a second measuring mode, the read-out circuit is selectable to be configured to operably measure the first time-of-fly of the first light pulse according to a time difference between the second light conversion signal and the first light conversion signal.

13. The distance meter circuit of claim 1, when the adjustable delay circuit is characterized in (b), wherein the distance meter circuit further comprises a second synchronizing circuit, wherein the adjustable delay circuit is configured to operably generate a delayed clock signal by delaying the clock signal with the adjustable delay time, wherein the driving pulse is synchronized according to the delayed clock signal by the second synchronizing circuit, thereby the phase difference is regulated to the predetermined value.

14. A distance measuring method, comprising:

generating a driving pulse according to a measuring control signal to drive a photonic emission device to emit a first light pulse to an object;

generating a first light conversion signal, using a first photonic sensing device, in response to the first light pulse reflected by the object;

measuring a first time-of-fly (TOF) of the first light pulse traveling from the photonic emission device to the first photonic sensing device through reflecting by the object according to a time difference between a measuring trigger signal and the first light conversion signal, wherein the measuring trigger signal is generated according to the measuring control signal;

providing an adjustable delay time for (a) generating the measuring trigger signal, or for (b) generating the driving pulse; and adjusting the adjustable delay time by comparing a phase difference between the measuring trigger signal and a driving related signal which is generated according to the measuring control signal and is related to the driving pulse, thereby regulating the phase difference to a predetermined value by feedback control scheme;

wherein the step of adjusting the adjustable delay time includes:

generating a phase difference signal by detecting the phase difference between the measuring trigger signal and the driving related signal;

up or down counting according to the phase difference signal; and generating a delay control signal, for adjusting the adjustable delay time, by low-pass-filtering a result of the step of up or down counting.

15. The distance measuring method of claim 14, wherein the phase difference is regulated to 0.

16. The distance measuring method of claim 14, further comprising:

generating a pre-trigger signal synchronized to a clock signal;

delaying the pre-trigger signal with the adjustable delay time generate the measuring trigger signal.

17. The distance measuring method of claim 14, when the adjustable delay time is provided for (a), the step of providing the adjustable delay time includes:

delaying a clock signal to generate a delayed clock signal; and synchronizing the measuring trigger signal by the delayed clock signal, thereby the phase difference is regulated to the predetermined value.

18. The distance measuring method of claim 14, wherein the driving pulse is provided by a driving transistor which is coupled to and is configured to drive the photonic emission device, wherein the driving related signal is electrically connected to a drain of the driving transistor, a gate of the driving transistor, or a terminal of the photonic emission device.

19. The distance measuring method of claim 14, when the adjustable delay time is provided for (b), wherein the driving pulse is generated according to a pre-driving signal, wherein the step of providing the adjustable delay time includes:

delaying the pre-driving signal by the adjustable delay time for generating the driving pulse, thereby the phase difference is regulated to the predetermined value.

20. The distance measuring method of claim 19, further comprising:

providing a predetermined delay time for generating the measuring trigger signal.

21. The distance measuring method of claim 20, wherein the predetermined delay time is long to an extent that the measuring trigger signal is later than the driving pulse when the adjustable delay time is configured as a minimum delay time.

22. The distance measuring method of claim 14, when the adjustable delay time is provided for (b), the step of providing the adjustable delay time includes:

delaying a clock signal to generate a delayed clock signal; and synchronizing the driving pulse by the delayed clock signal, thereby the phase difference is regulated to the predetermined value.

* * * * *